(12) United States Patent
Pang

(10) Patent No.: US 10,639,852 B2
(45) Date of Patent: May 5, 2020

(54) STEREOLITHOGRAPHY 3D PRINTER

(71) Applicants: XYZPRINTING, INC., New Taipei (TW); KINPO ELECTRONICS, INC., New Taipei (TW)

(72) Inventor: Bo Pang, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 77 days.

(21) Appl. No.: 15/698,002

(22) Filed: Sep. 7, 2017

(65) Prior Publication Data

US 2019/0070793 A1 Mar. 7, 2019

(51) Int. Cl.
*B29C 67/00* (2017.01)
*B29C 64/135* (2017.01)
(Continued)

(52) U.S. Cl.
CPC ............ *B29C 67/00* (2013.01); *B29C 64/135* (2017.08); *B29C 64/223* (2017.08);
(Continued)

(58) Field of Classification Search
CPC ..... B29C 67/00; B29C 64/223; B29C 64/357; B29C 64/135; B29C 2791/001; B29C 2791/002
(Continued)

(56) References Cited

U.S. PATENT DOCUMENTS

2005/0208168 A1* 9/2005 Hickerson .............. B33Y 10/00
425/174.4
2006/0249884 A1* 11/2006 Partanen ................ B33Y 10/00
264/401
(Continued)

FOREIGN PATENT DOCUMENTS

JP H07164534 A 6/1995
WO 2011111957 A2 9/2011
(Continued)

OTHER PUBLICATIONS

Search Report date Apr. 30, 2018 of the corresponding European patent application.
(Continued)

*Primary Examiner* — Seyed Masoud Malekzadeh
*Assistant Examiner* — Guy F Mongelli
(74) *Attorney, Agent, or Firm* — Chun-Ming Shih; HDLS IPR Services

(57) ABSTRACT

A stereolithography 3D printer (10) includes: a transporting mechanism (1) having a translucent conveyor belt (11) with its top divided into a discharge area (13) and a receiving area (14); a discharging mechanism (2) installed in the discharge area (13) and including a first material box (21) and a discharge nozzle (22) corresponsive to the first material box (21), and the first material box (21) having a discharge port (211); and a recycling mechanism (3) installed in the receiving area (14) and including a second material box (31) and a receiving sucker tip (32), and the first material box (21)
(Continued)

and second material box (31) being disposed adjacent or attached to the translucent conveyor belt (11), and the receiving sucker tip (32) being corresponsive to the second material box (31), and the second material box (31) having a receiving port (311).

8 Claims, 16 Drawing Sheets

(51) Int. Cl.
  *B29C 64/357* (2017.01)
  *B29C 64/223* (2017.01)
(52) U.S. Cl.
  CPC ...... *B29C 64/357* (2017.08); *B29C 2791/001* (2013.01); *B29C 2791/002* (2013.01)
(58) Field of Classification Search
  USPC ........................................................ 425/375
  See application file for complete search history.

(56) References Cited

U.S. PATENT DOCUMENTS

| | | | | |
|---|---|---|---|---|
| 2007/0259066 | A1* | 11/2007 | Sperry | B29C 64/135 425/174.4 |
| 2008/0169586 | A1* | 7/2008 | Hull | B29C 64/20 264/401 |
| 2009/0020901 | A1* | 1/2009 | Schillen | B29C 70/88 264/31 |
| 2009/0184444 | A1* | 7/2009 | Honda | B33Y 40/00 264/401 |
| 2011/0052928 | A1* | 3/2011 | Shionoiri | G03G 15/1605 428/500 |
| 2014/0030473 | A1* | 1/2014 | Boyd | D06M 10/003 428/96 |
| 2014/0265032 | A1* | 9/2014 | Teicher | B33Y 50/02 264/401 |
| 2014/0306380 | A1* | 10/2014 | El-Siblani | B33Y 10/00 264/401 |
| 2016/0059485 | A1* | 3/2016 | Ding | B33Y 10/00 264/401 |
| 2016/0325356 | A1* | 11/2016 | Hirata | B28B 1/001 |
| 2017/0165792 | A1* | 6/2017 | Buller | B29C 64/307 |

FOREIGN PATENT DOCUMENTS

| | | | | |
|---|---|---|---|---|
| WO | 2016153106 | A1 | 9/2016 | |
| WO | WO-2016153106 | A1 * | 9/2016 | ............ B33Y 30/00 |

OTHER PUBLICATIONS

Office Action date Mar. 3, 2020 of the corresponding Japan patent application.

* cited by examiner

STEREOLITHOGRAPHY 3D PRINTER

BACKGROUND OF THE INVENTION

Field of the Invention

This disclosure relates to a printing device, and more particularly to a stereolithography 3D printer.

Description of Prior Art

In 3D printing, a software program such as the computer-aided design (CAD) is generally used to create data of a 3D model, and then a construction material is heated, cooled, or cured to form a correct cross-sectional layer of the shape on the X-Y plane, and finally several cross-sectional layers are stacked gradually and continuously along the Z-axis, so that the construction material is cured layer by layer to form a predetermined 3D object.

In a traditional stereolithography 3D printer, an elevating platform is provided and submerged into a liquid formation material contained in a tank, and a light source module projects light on the X-Y plane to act as a liquid formation material for the construction material, so that the liquid formation material is cured by the light, and then the elevating platform is moved gradually from layer to layer along the Z-axis, and the liquid formation material is cured layer by layer and stacked on the elevating platform to form the 3D object.

However, the aforementioned traditional stereolithography 3D printer has the following drawbacks: During the process of stacking and forming layers of the 3D object, the cured liquid formation material may be adhered to the bottom of the tank and may hinder the light source and affect the following formation result. Therefore, it is a main subject of the conventional photolithography 3D printing technology to improve the accuracy, speed and success rate of a 3D printer.

In view of the aforementioned drawbacks of the conventional optical transceiver module, the discloser of this disclosure based on years of experience to conduct extensive research and experiment, and finally provided a feasible design to overcome the drawbacks of the prior art.

SUMMARY OF THE INVENTION

Therefore, it is a primary objective of this disclosure to provide a stereolithography 3D printer using a curing layer that will be attached onto a moving platform completely, and a recycling mechanism to recycle a printing material in order to overcome the drawback of the conventional 3D printer having the curing layer stuck onto the bottom of the tank to hinder the curing light source, so as to improve the printing accuracy, speed, and success rate of the stereolithography 3D printer of this disclosure.

To achieve the aforementioned objective, this disclosure provides a stereolithography 3D printer, comprising: a transporting mechanism, including a translucent conveyor belt with a top divided into a discharge area and a receiving area and a curing area defined between the discharge area and the receiving area; a discharging mechanism, installed in the discharge area, and including a first material box and a discharge nozzle, and the first material box being disposed adjacent or attached to the translucent conveyor belt, and the discharge nozzle being configured to be corresponsive to the first material box, and the first material box having a discharge port formed on a side thereof; a recycling mechanism, installed in the receiving area, and including a second material box and a receiving sucker tip, and the second material box being disposed adjacent or attached to the translucent conveyor belt, and the receiving sucker tip being configured to be corresponsive to the second material box, and the second material box having a receiving port formed on a side thereof, and the discharge port and the receiving port being configured to be corresponsive to each other, and the translucent conveyor belt moving in a direction from the discharge port towards the receiving port; a moving platform, installed in the curing area, and capable of moving close to or away from the translucent conveyor belt; and a curing light source, configured to be corresponsive to the curing area.

Based on the description above, the first material box has an adjustable valve, installed at the discharge port and capable of moving close to or away from the translucent conveyor belt, and the adjustable valve has a scraper, and the gap between the scraper and the translucent conveyor belt may be adjusted to control the thickness and flatness of the printing material after the printing material exits from the discharge port.

DESCRIPTION OF THE PREFERRED EMBODIMENTS

Figure 1:
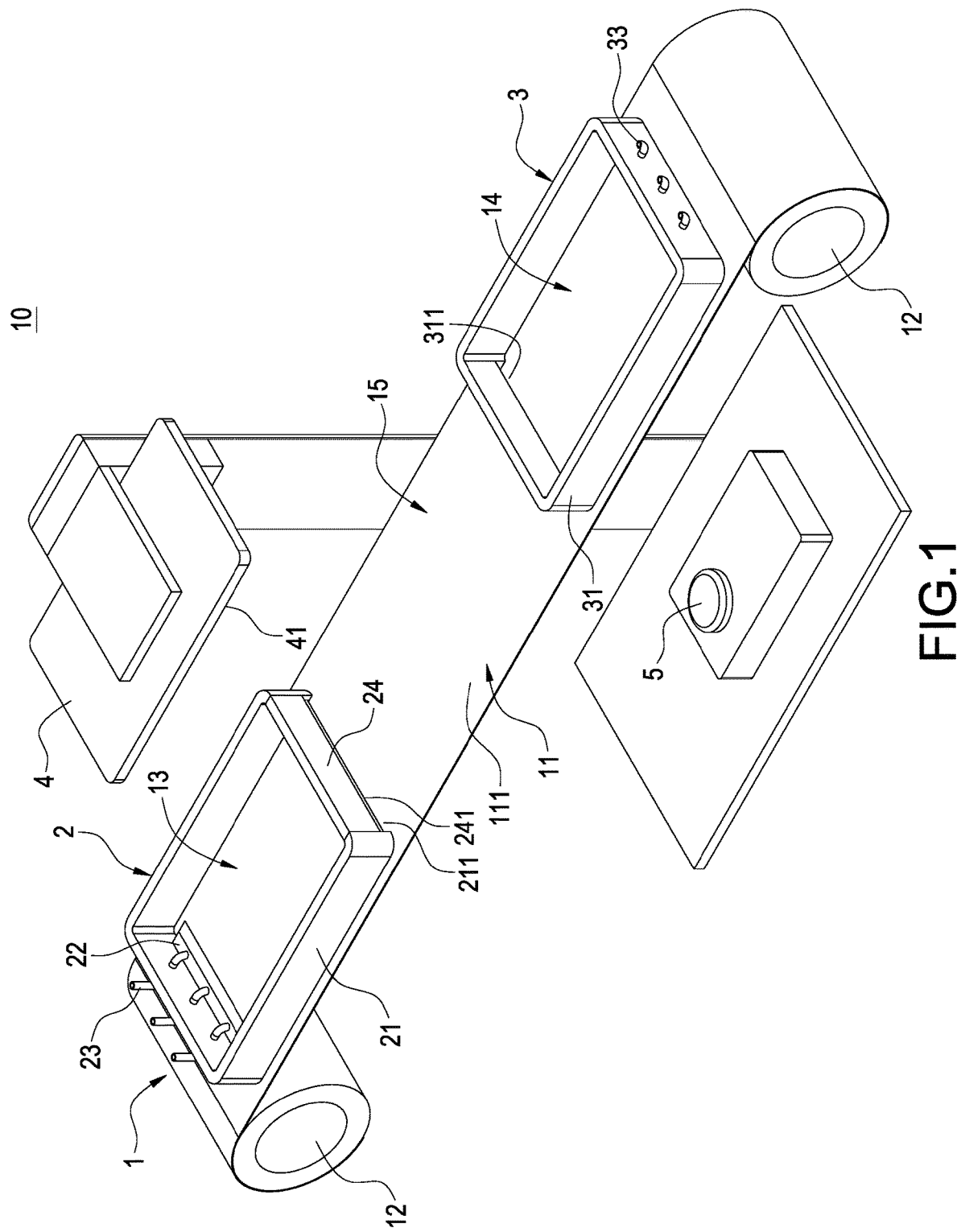
FIG. 1 is a perspective view of a stereolithography 3D printer of this disclosure.
Figure 2:
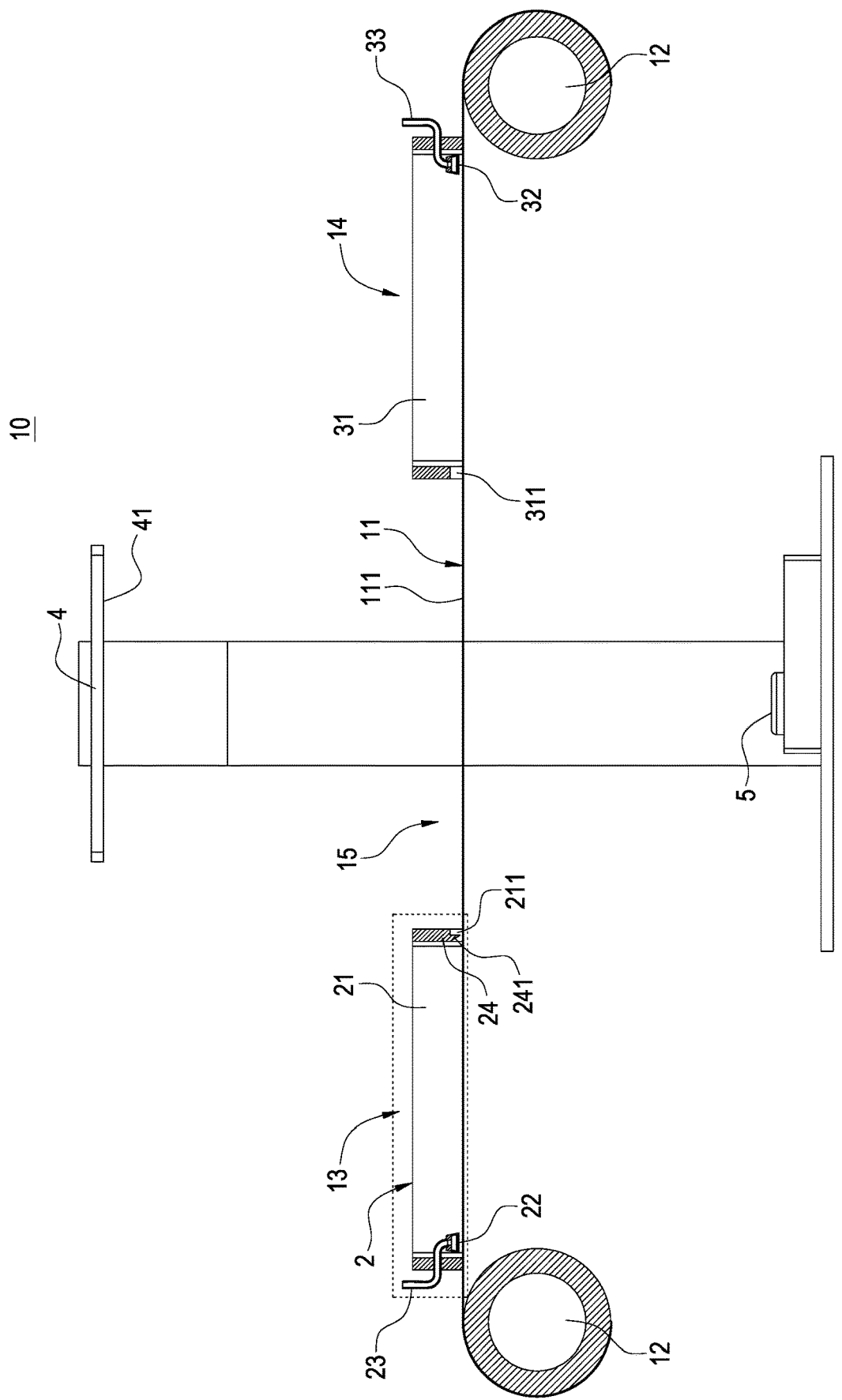
FIG. 2 is a sectional view of a stereolithography 3D printer of this disclosure.
Figure 3:
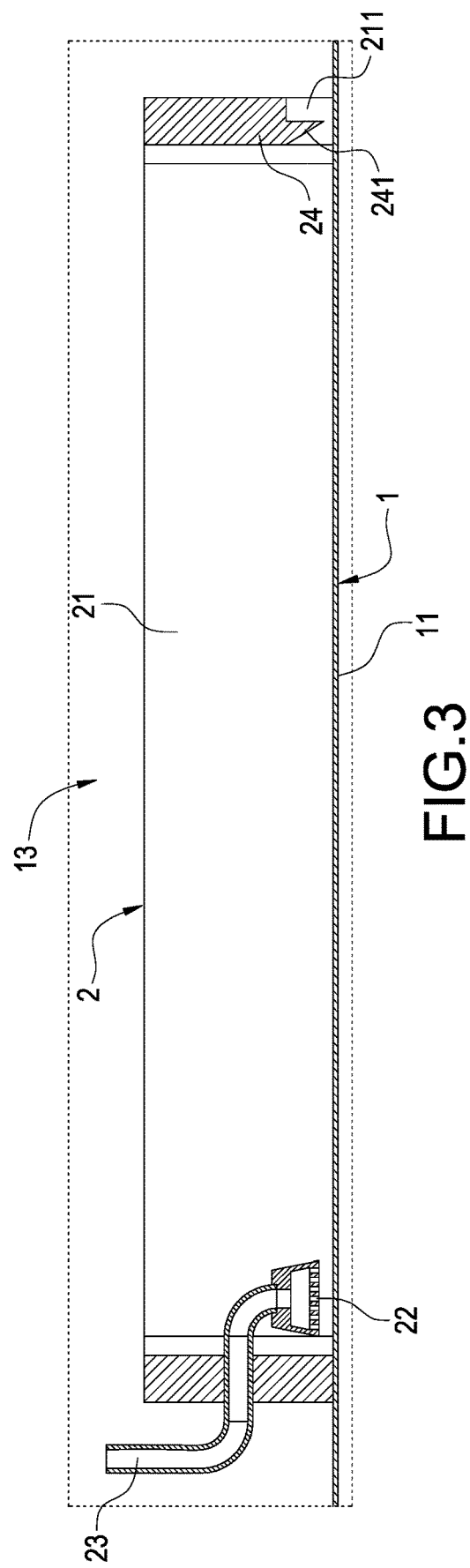
FIG. 3 is a partial sectional view of a stereolithography 3D printer of this disclosure.
Figure 4:
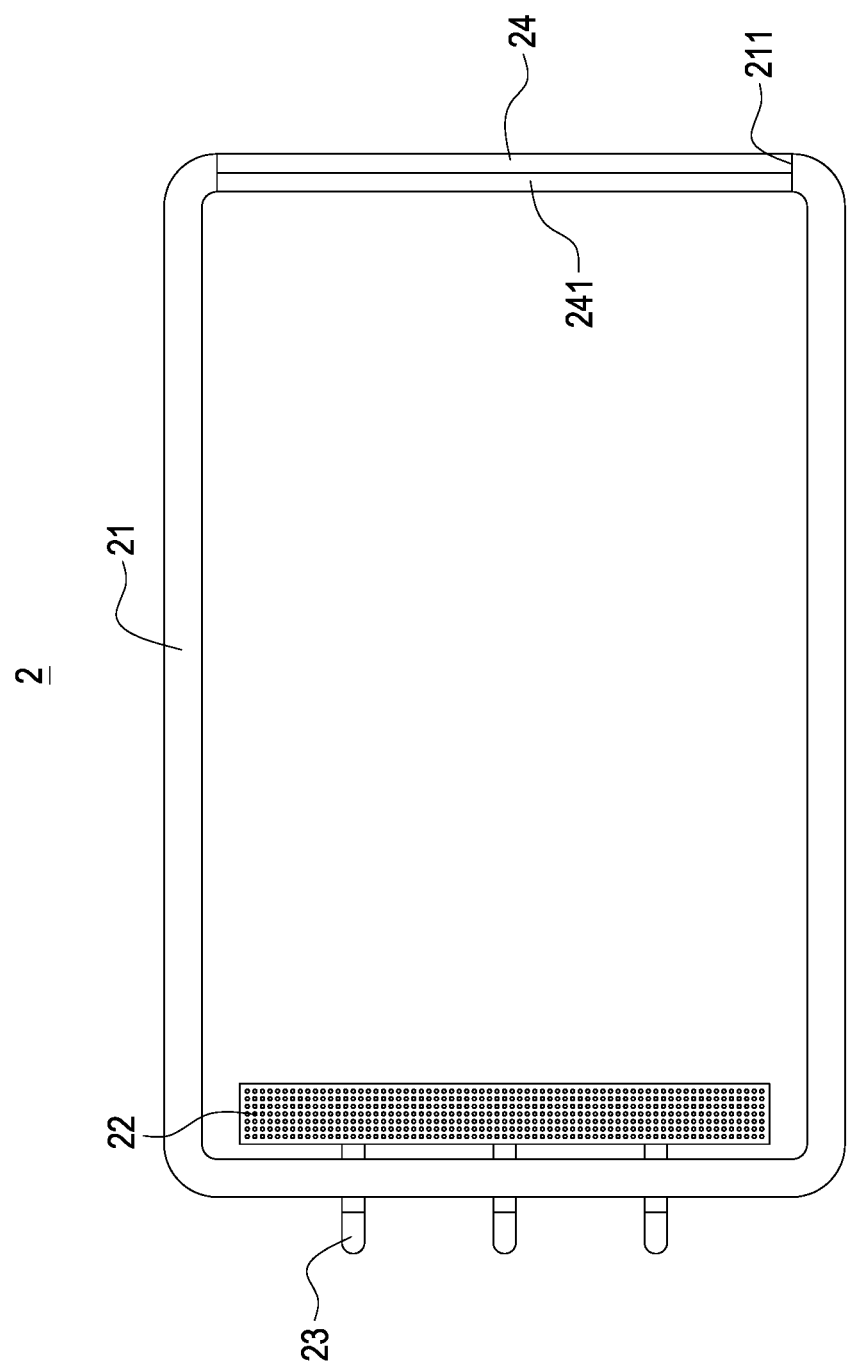
FIG. 4 is a bottom view of a first material box of this disclosure.

The technical contents of this disclosure will become apparent with the detailed description of preferred embodiments accompanied with the illustration of related drawings as follows. It is noteworthy that same numerals are used for representing same respective elements in the drawings.

With reference to FIGS. 1 to 15 for a stereolithography 3D printer of this disclosure, the stereolithography 3D printer 10 comprises a transporting mechanism 1, a discharging mechanism 2, a recycling mechanism 3, a moving platform 4 and a curing light source 5.

In FIGS. 1, 2, and 5 to 15, the transporting mechanism 1 includes a translucent conveyor belt 11 with the top divided into a discharge area 13 and a receiving area 14, and a curing area 15 defined between the discharge area 13 and the receiving area 14.

In this embodiment, the translucent conveyor belt 11 is a translucent film 111, and the transporting mechanism 1 further includes two reels 12, and both ends of the translucent film 111 are wound around the two reels 12 respectively, and the two reels 12 is capable of controlling its rotating speed difference to adjust the tension of the translucent film 111.

In FIGS. 1 to 15, the discharging mechanism 2 is installed in the discharge area 13, and the discharging mechanism 2 includes a first material box 21 and a discharge nozzle 22, and the first material box 21 is disposed adjacent to or attached to the translucent conveyor belt 11, and the discharge nozzle 22 is configured to be corresponsive to the first material box 21, and a discharge port 211 is formed on a side of the first material box 21. Wherein, the discharge nozzle 22 is configured to be corresponsive to the middle or an inner side of the discharge nozzle 22 away from the discharge port 211. However, this disclosure is not limited to such arrangement only.

Specifically, the discharging mechanism 2 further includes an adjustable valve 24 installed at the discharge port 211 and capable of moving close to or away from the translucent conveyor belt 11, and the adjustable valve 24 has a scraper 241 extended in a direction towards the translucent conveyor belt 11.

In addition, the discharging mechanism 2 further includes a plurality of material tubes 23 installed at the top of the discharge nozzle 22 and communicated to the discharge nozzle 22, and each material tube 23 is a material supply tube having a different color or being made of a different material.

In FIGS. 1, 2, and 5 to 15, the recycling mechanism 3 is installed in the receiving area 14, and the recycling mechanism 3 includes a second material box 31 and a receiving sucker tip 32, and the second material box 31 is disposed adjacent to or attached to the translucent conveyor belt 11, and the receiving sucker tip 32 is configured to be corresponsive to the second material box 31, and a receiving port 311 is formed on a side of the second material box 31, and the discharge port 211 and the receiving port 311 are configured to be opposite to each other, and the translucent conveyor belt 11 is moved in a direction from the discharge port 211 to the receiving port 311, and the discharge port 211 has an opening width a smaller than the opening width b of the receiving port 311. Wherein, the receiving sucker tip 32 is configured to be corresponsive to the middle or an inner side of the receiving sucker tip 32 away from the receiving port 311. However, this disclosure is not limited to such arrangement only.

In addition, both first material box 21 and second material box 31 are in a rectangular shape, and both discharge nozzle 22 and receiving sucker tip 32 are in a long-stripe shape. However, this disclosure is not limited to such arrangements only. Therefore, the discharge nozzles 22 are distributed and scattered as much as possible along the width of the first material box 21, and the receiving sucker tips 32 are distributed and scattered as much as possible along the width of the second material box 31 to facilitate the process of filling the printing material 100 into the first material box 21 or and sucking the printing material 100 by the receiving sucker tip 32 quickly.

In addition, the recycling mechanism 3 further comprises a plurality of suction tubes 33 installed at the top of the receiving sucker tip 32 and communicated to the receiving sucker tip 32, and each suction tube 33 is uniformly installed at the top of the receiving sucker tip 32, so that the receiving sucker tip 32 has uniform suction.

In FIGS. 1, 2, 5, 7, 9 to 11, 13, and 15, the moving platform 4 is installed in the curing area 15 and capable of moving close to or away from the translucent conveyor belt 11, and the moving platform 4 has a bearing surface 41 configured to be opposite to the translucent conveyor belt 11, and the bearing surface 41 has a surface friction coefficient greater than the surface friction coefficient of the translucent conveyor belt 11.

In FIGS. 1, 2, 5, 7, 9, 11, 13, and 15, the curing light source 5 is configured to be corresponsive to the curing area 15, and the curing light source 5 is installed under the translucent conveyor belt 11 and the curing area 15, and the curing light source 5 is capable of projecting light to the printing material 100, so that the printing material 100 is cured to form a curing layer 200.

With reference to FIGS. 1 to 15 for an assembly of the stereolithography 3D printer 10 of this disclosure, the stereolithography 3D printer 10 comprises: a transporting mechanism 1 including a translucent conveyor belt 11 with the top divided into a discharge area 13, and a receiving area 14, and a curing area 15 defined between the discharge area 13 and the receiving area 14, wherein the discharging mechanism 2 is installed in the discharge area 13, and the discharging mechanism 2 includes a first material box 21 and a discharge nozzle 22, and the first material box 21 is disposed adjacent to or attached to the translucent conveyor belt 11, and the discharge nozzle 22 is configured to be corresponsive to the first material box 21, and a discharge port 211 is formed on a side of the first material box 21; a recycling mechanism 3 installed in the receiving area 14, and the recycling mechanism 3 includes a second material box 31 and a receiving sucker tip 32, and the second material box 31 is disposed adjacent to or attached to the translucent conveyor belt 11, and the receiving sucker tip 32 is configured to be corresponsive to the second material box 31, and a receiving port 311 is formed on a side of the second material box 31, and the discharge port 211 and the receiving port 311 are configured to be opposite to each other, and the translucent conveyor belt 11 is moved in a direction from the discharge port 211 towards the receiving port 311; a moving platform 4 installed in the curing area 15 and capable of moving close to or away from the translucent conveyor belt 11; and a curing light source 5 configured to be corresponsive to the curing area 15.

Figure 5:
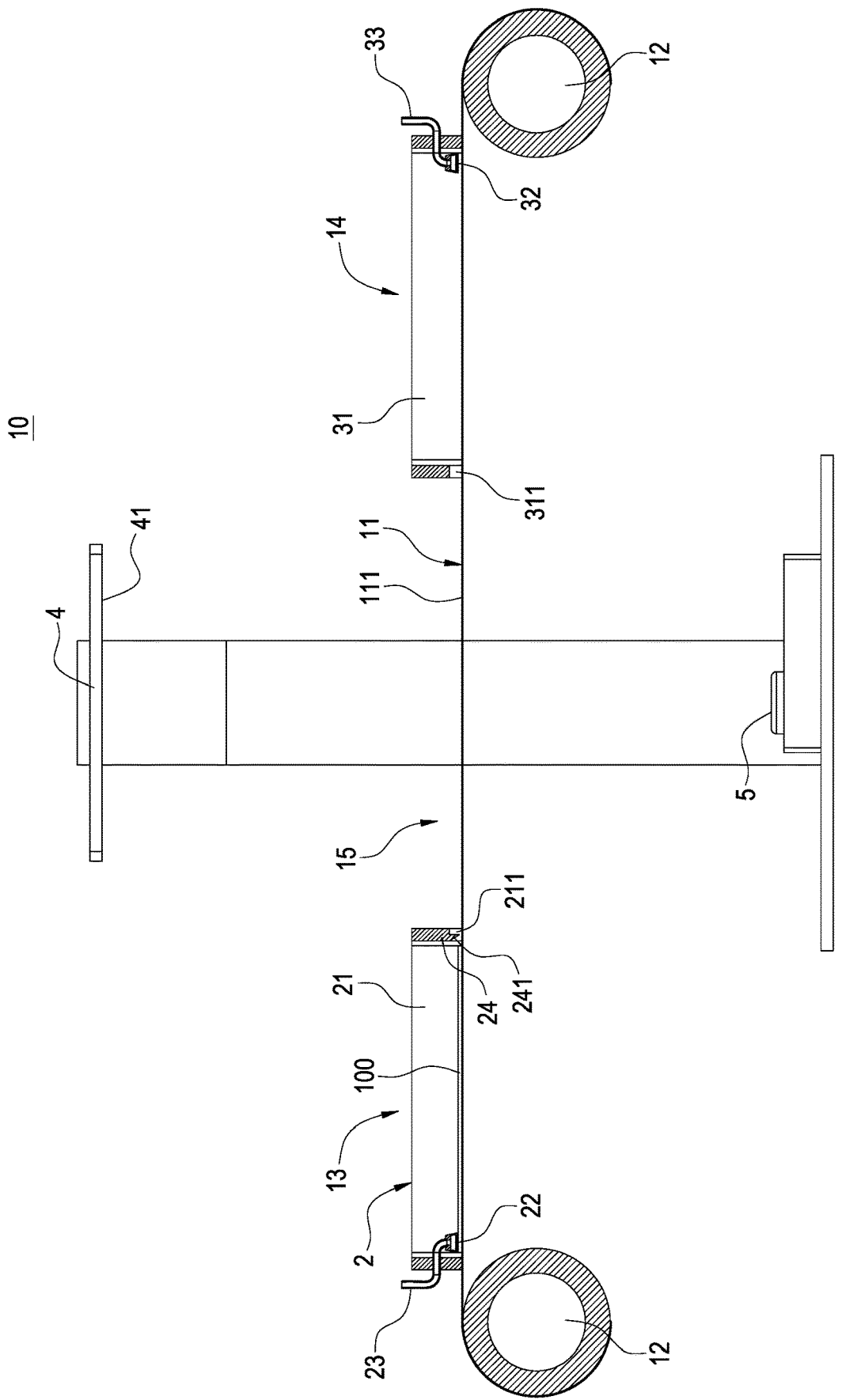
FIG. 5 is a sectional view showing a first using status of a stereolithography 3D printer of this disclosure.
Figure 6:
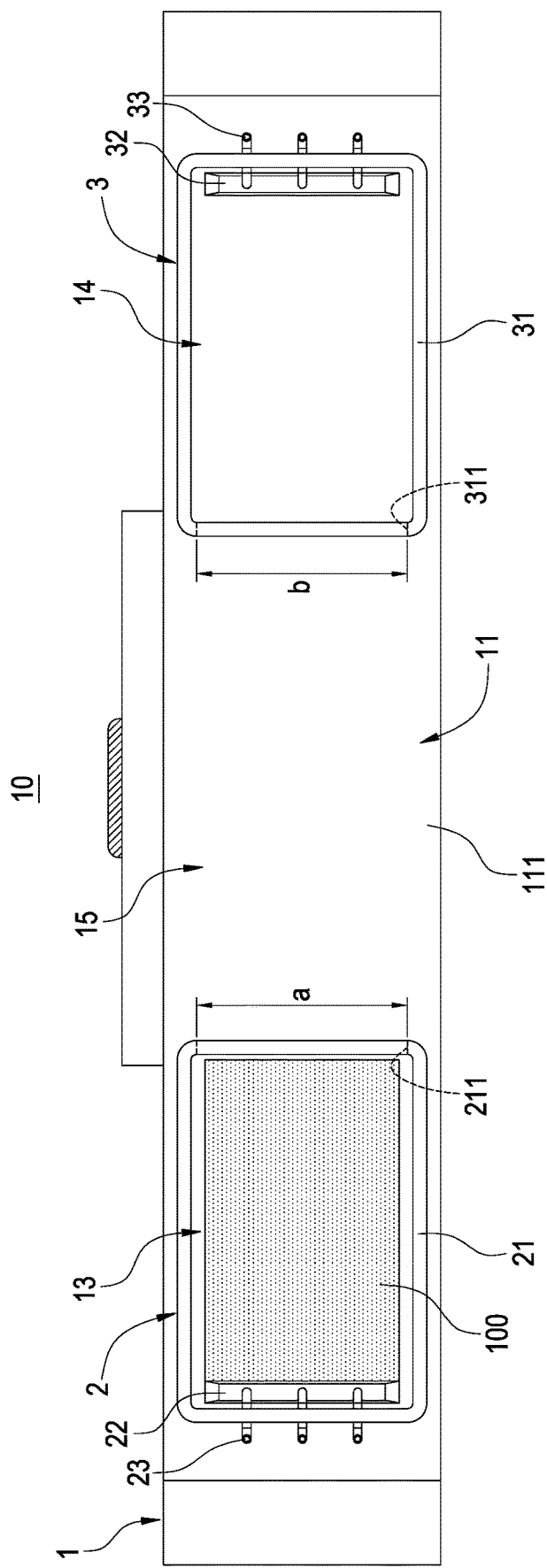
FIG. 6 is a top view showing the first using status of a stereolithography 3D printer of this disclosure.
Figure 7:
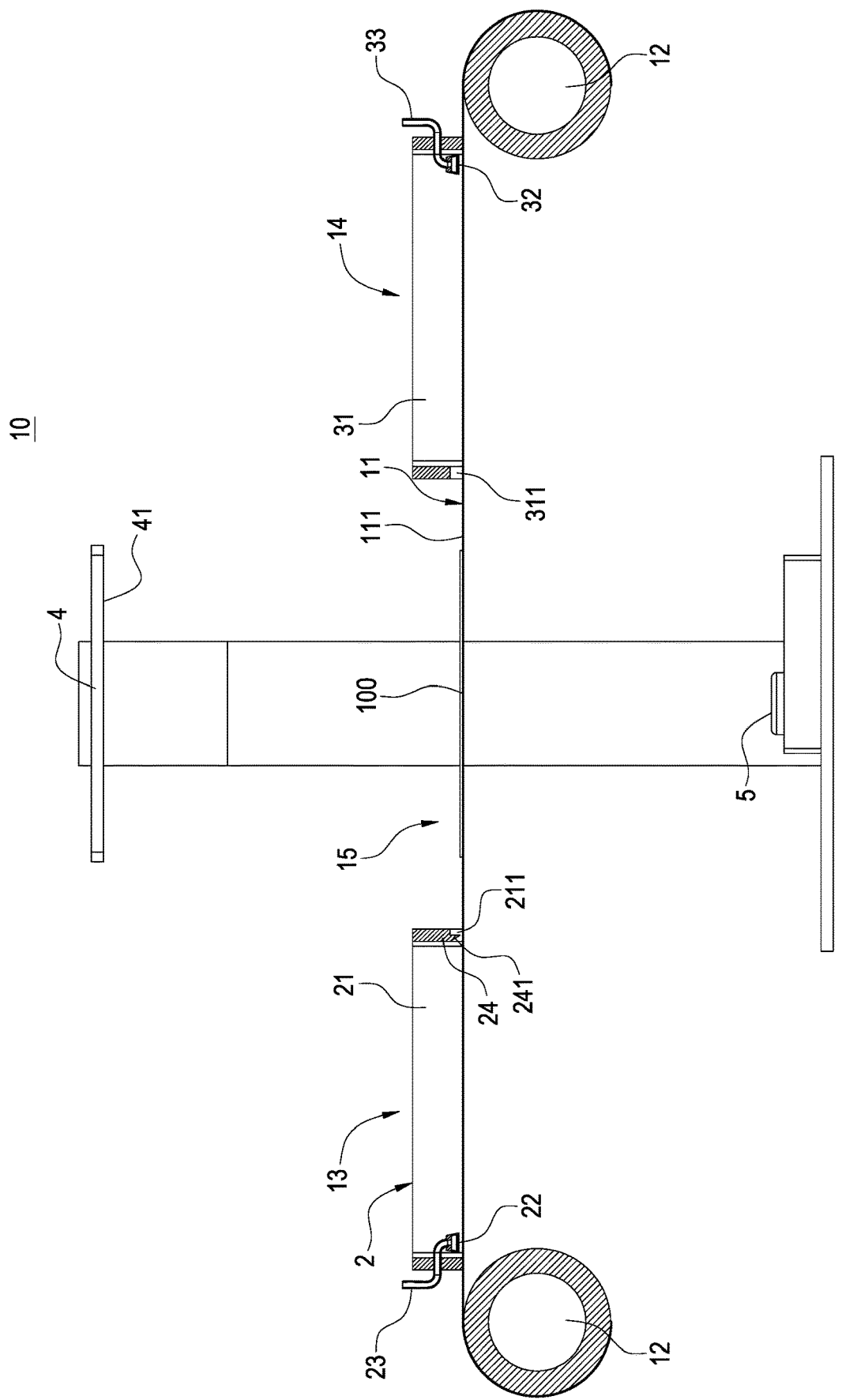
FIG. 7 is a sectional view showing a second using status of a stereolithography 3D printer of this disclosure.
Figure 8:
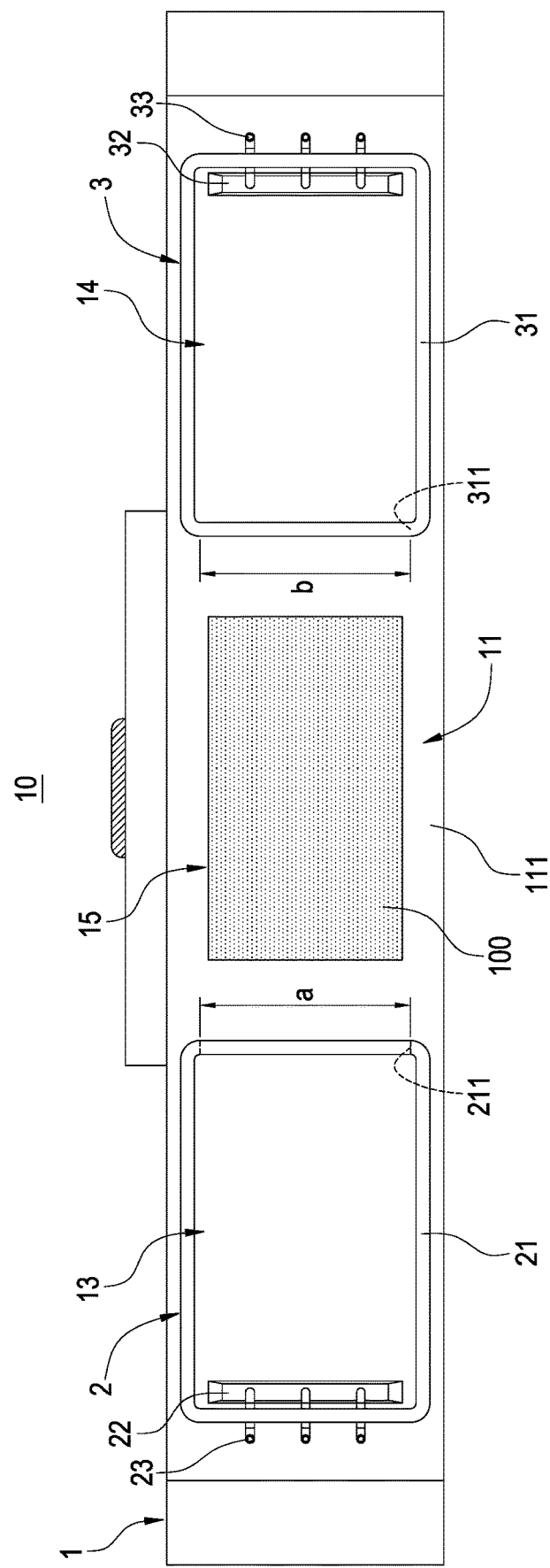
FIG. 8 is a top view showing the second using status of a stereolithography 3D printer of this disclosure.
Figure 9:
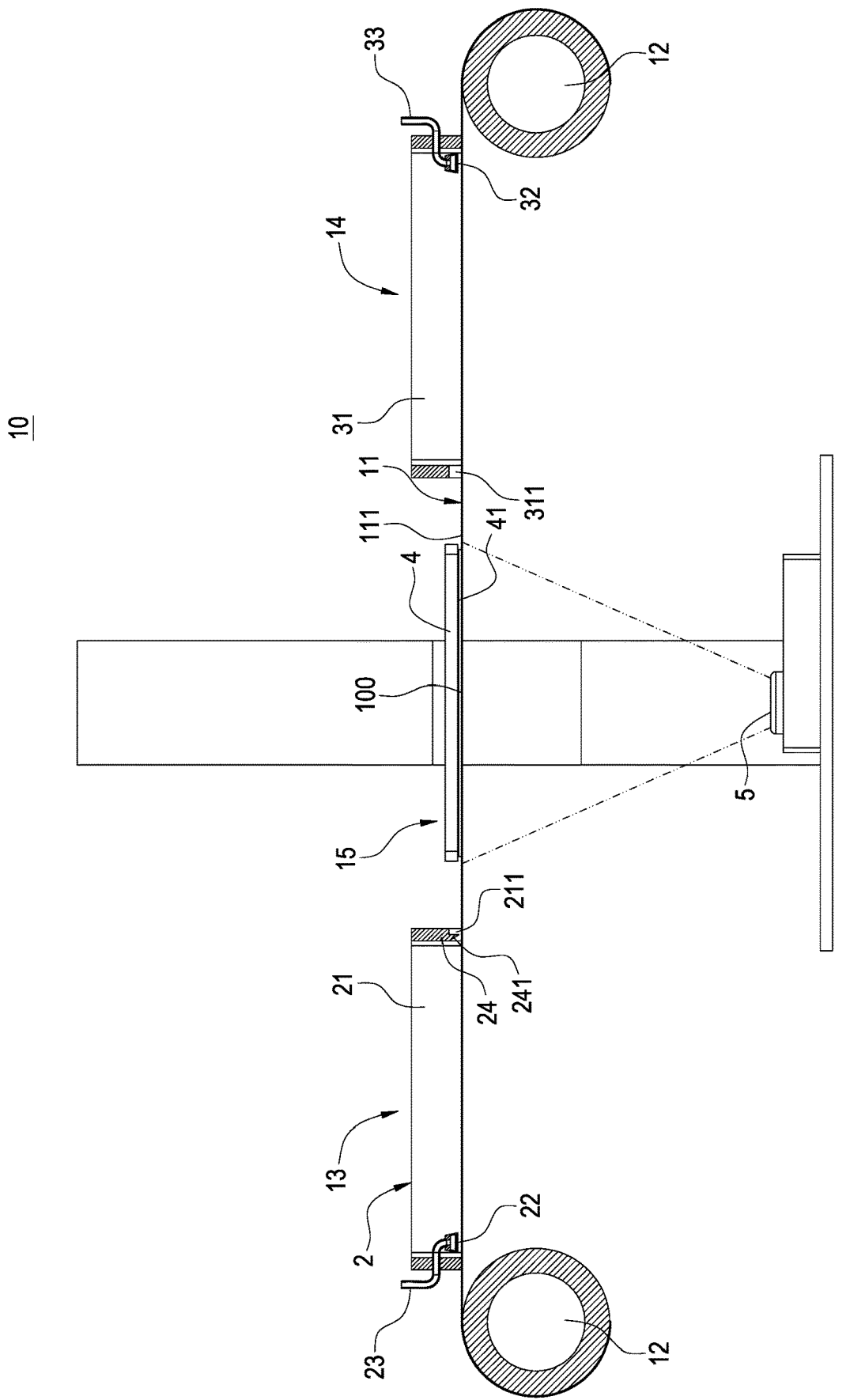
FIG. 9 is a sectional view showing a third using status of a stereolithography 3D printer of this disclosure.
Figure 10:
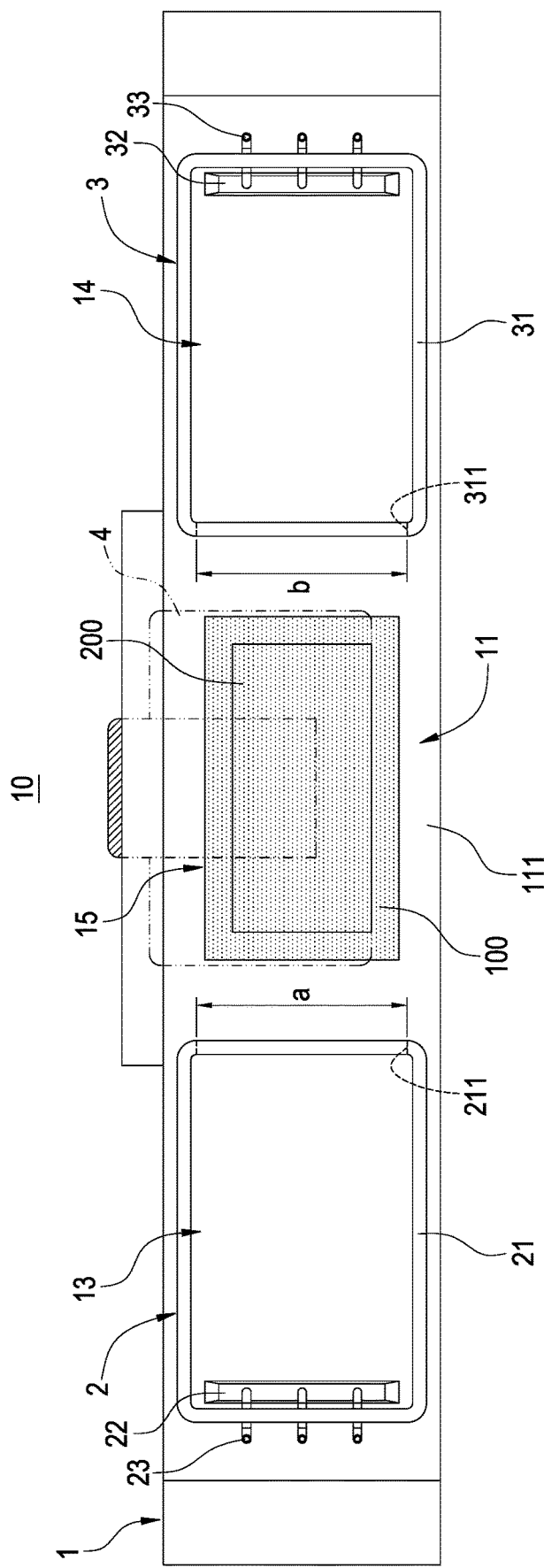
FIG. 10 is a top view showing the third using status of a stereolithography 3D printer of this disclosure.
Figure 11:
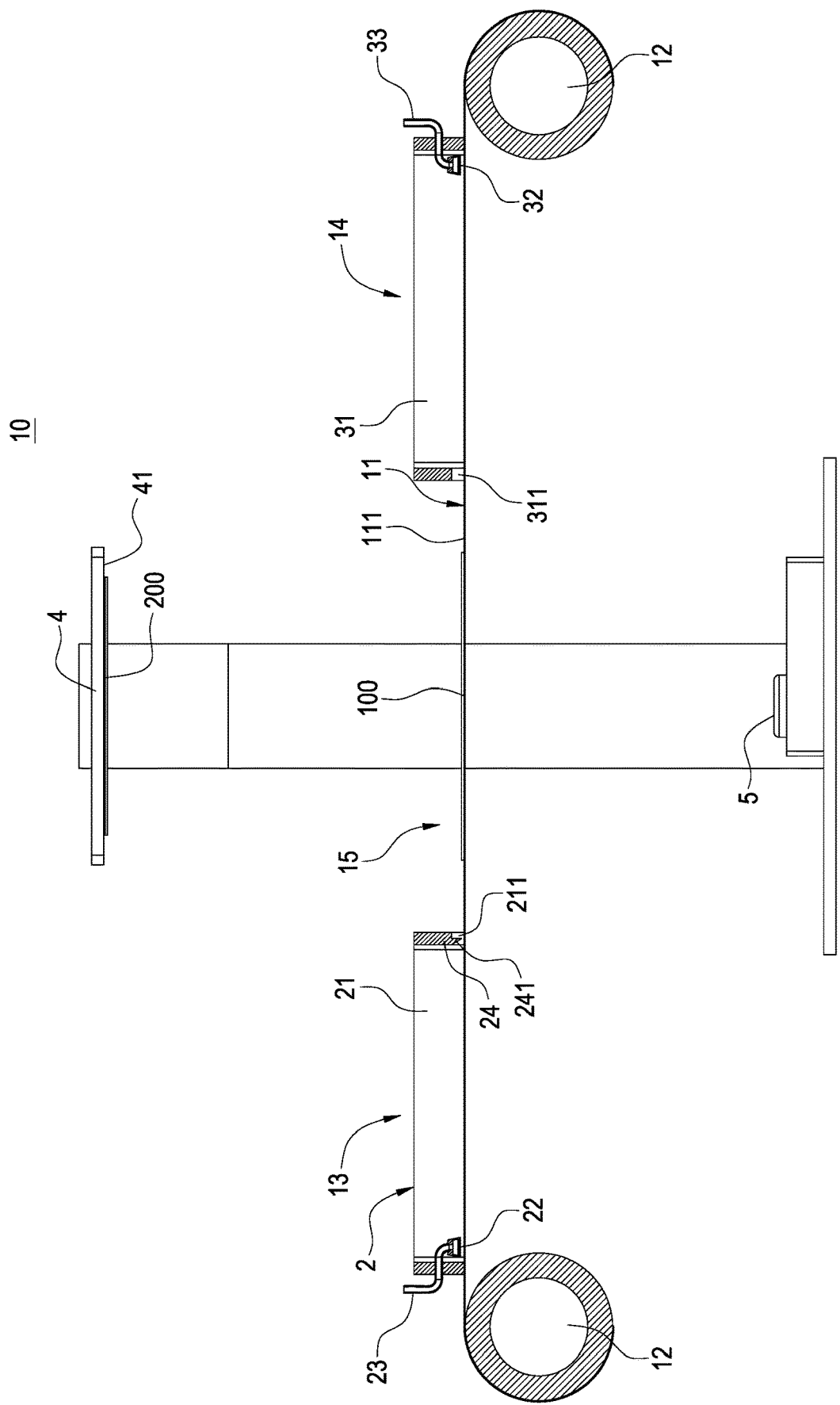
FIG. 11 is a sectional view showing a fourth using status of a stereolithography 3D printer of this disclosure.
Figure 12:
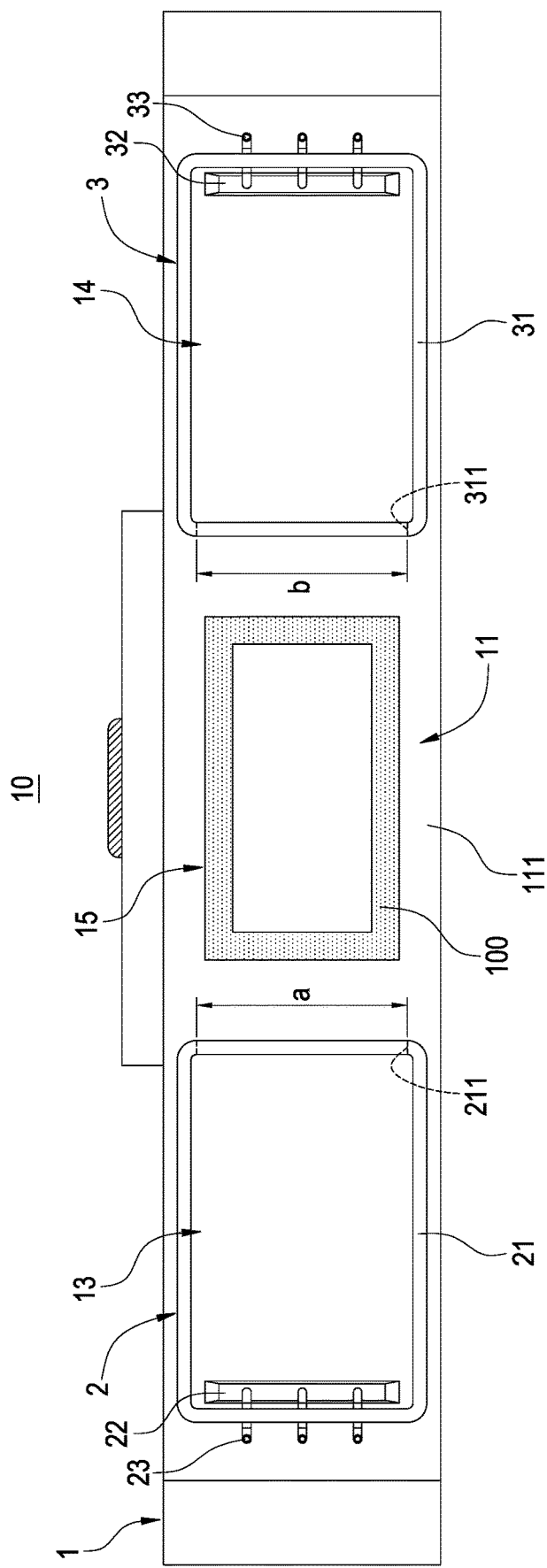
FIG. 12 is a top view showing the fourth using status of a stereolithography 3D printer of this disclosure.
Figure 13:
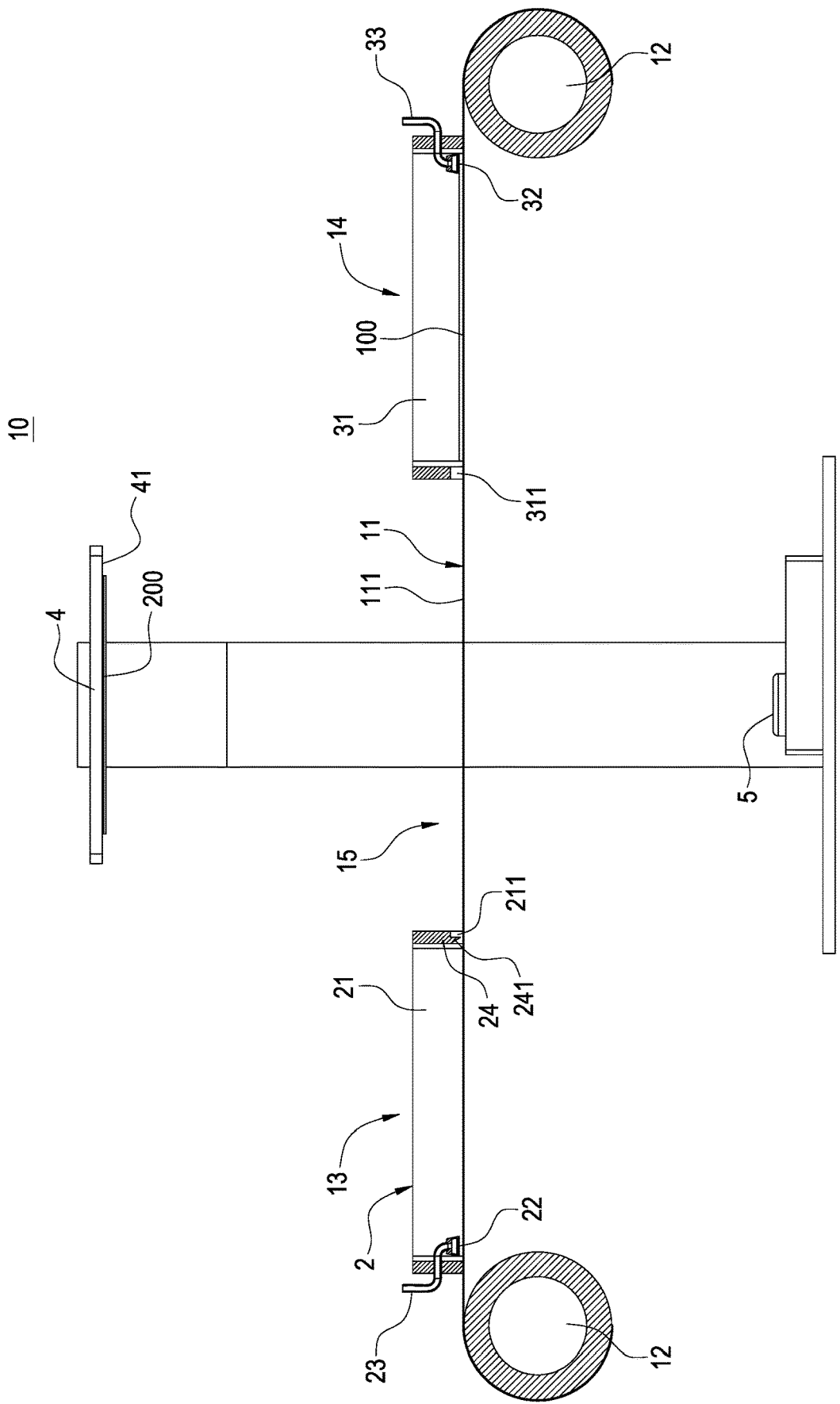
FIG. 13 is a sectional view showing a fifth using status of a stereolithography 3D printer of this disclosure.
Figure 14:
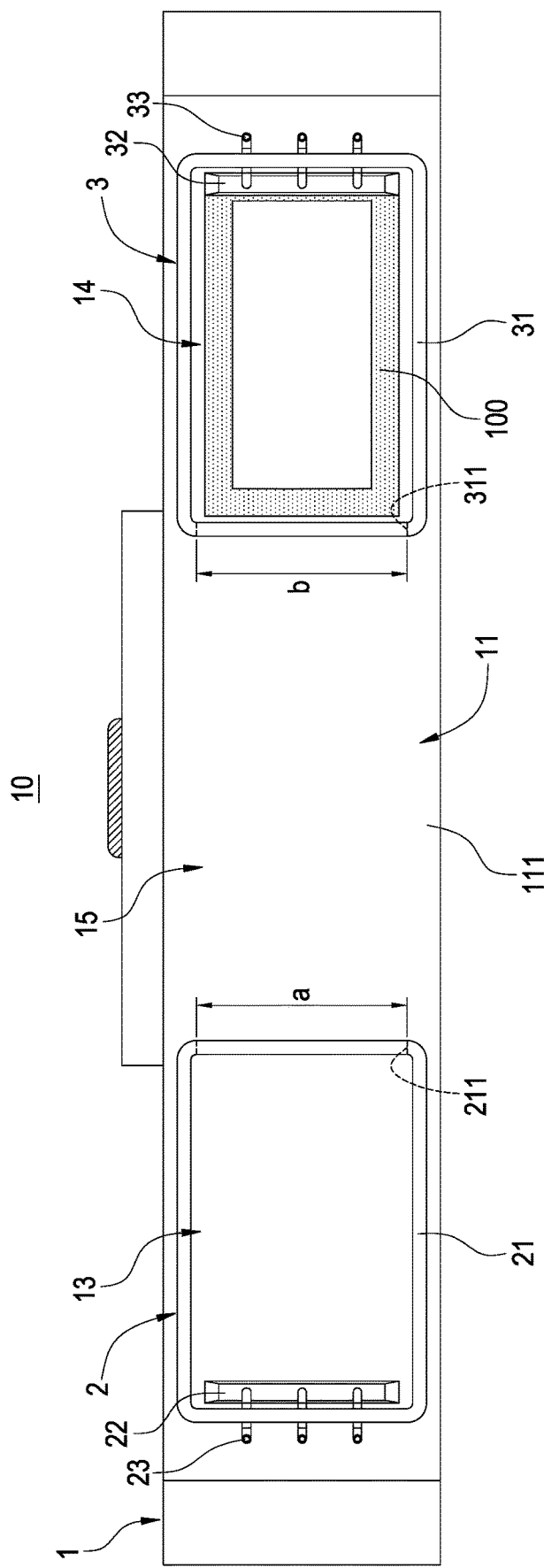
FIG. 14 is a top view showing the fifth using status of a stereolithography 3D printer of this disclosure.
Figure 15:
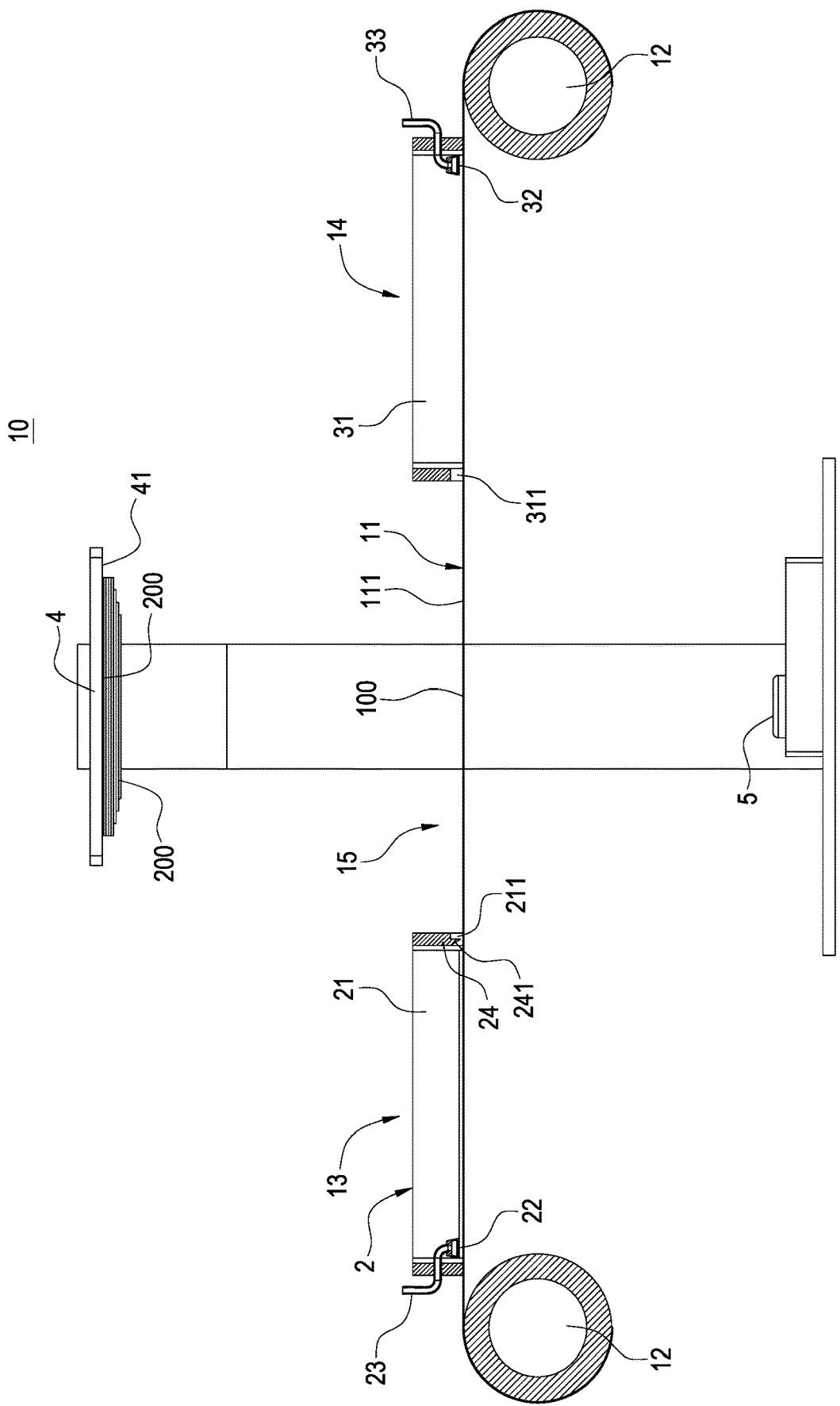
FIG. 15 is a sectional view showing a sixth using status of a stereolithography 3D printer of this disclosure.

With reference to FIGS. 5 to 15 for different using statuses of a stereolithography 3D printer 10 of this disclosure, the first using status is shown in FIGS. 5 and 6, wherein the discharge nozzle 22 is provided for filling the printing material 100 into the first material box 21, and the translucent conveyor belt 11 continues moving in the direction from the discharge port 211 towards the receiving port 311, so that the printing material 100 gradually forms an appropriate area in the first material box 21; the second using status is shown in FIGS. 7 and 8, wherein the translucent conveyor belt 11 continues moving in the direction from the discharge port 211 towards the receiving port 311, so that the printing material 100 forming the appropriate area is passed through the discharge port 211 and scraped by an opening upper flange of the discharge port 21 (or the scraper 241) to form a thin-layer printing material 100; the third using status is shown in FIGS. 9 and 10, wherein the translucent conveyor belt 11 is paused, so that the thin-layer printing material 100 stays in the curing area 15, and the moving platform 4 moves downwardly and touches the printing material 100, and the light path of the curing light source 5 or the range or way of projecting light onto the printing material 100 may be adjusted, so that a part of the thin-layer printing material 100 is cured into a curing layer 200 in a predetermined shape; the fourth using status is shown in FIGS. 11 and 12, wherein the surface friction coefficient of the bearing surface 41 is greater than the surface friction coefficient of the translucent conveyor belt 11, so that the curing layer 200 will choose a surface with a greater surface friction coefficient to be attached thereon, and the curing layer 200 will be attached onto the bearing surface 41, and the remaining printing material 100 stays on the translucent conveyor belt 11; the fifth using status is shown in FIGS. 13 and 14, wherein the translucent conveyor belt 11 continues moving in a direction from the discharge port 211 towards the receiving port 311, and the remaining printing material 100 will enter into the second material box 31 through the receiving port 311, and finally the remaining printing material 100 is sucked and recycled by the receiving sucker tip 32 to complete the step of printing a layer; and the sixth using status is shown in FIG. 15, wherein the aforementioned step of printing a layer is repeated for several times, so that layers of the thin-layer printing material 100 are cured to form several curing layer 200, and finally the curing layers 200 are stacked on the moving platform 4 to from the predetermined 3D object. The curing layer 200 will be adhered onto the moving platform 4, and the recycling mechanism 3 will recycle the printing material 100, so as to overcome the drawbacks of the prior art including the attachment of the curing layer onto the bottom of the tank and the interference to the curing light source, and technical solution disclosed in this disclosure can improve the printing accuracy, speed and success rate of the stereolithography 3D printer 10 effectively stereolithography 3D printer 10. In addition, the first material box 21 has an adjustable valve 24 installed at the discharge port 211 and a scraper 241 extended from the adjustable valve 24, and the adjustable valve 24 is capable of moving close to or away from the translucent conveyor belt 11, so that the gap between the scraper 241 and the translucent conveyor belt 11 can be adjusted, and the scraper 241 is provided for scraping a layer of the thin-layer printing material 100 to the required thickness and flatness. After one layer of the thin-layer printing material 100 is cured to form a curing layer 200, the scraper 241 may be adjusted to control the thickness and flatness of the curing layer 200.

Further, the discharge port 211 has an opening width a smaller than the opening width b of the receiving port 311 to ensure that the remaining printing material 100 can enter into the second material box 31 through the receiving port 311.

Figure 16:
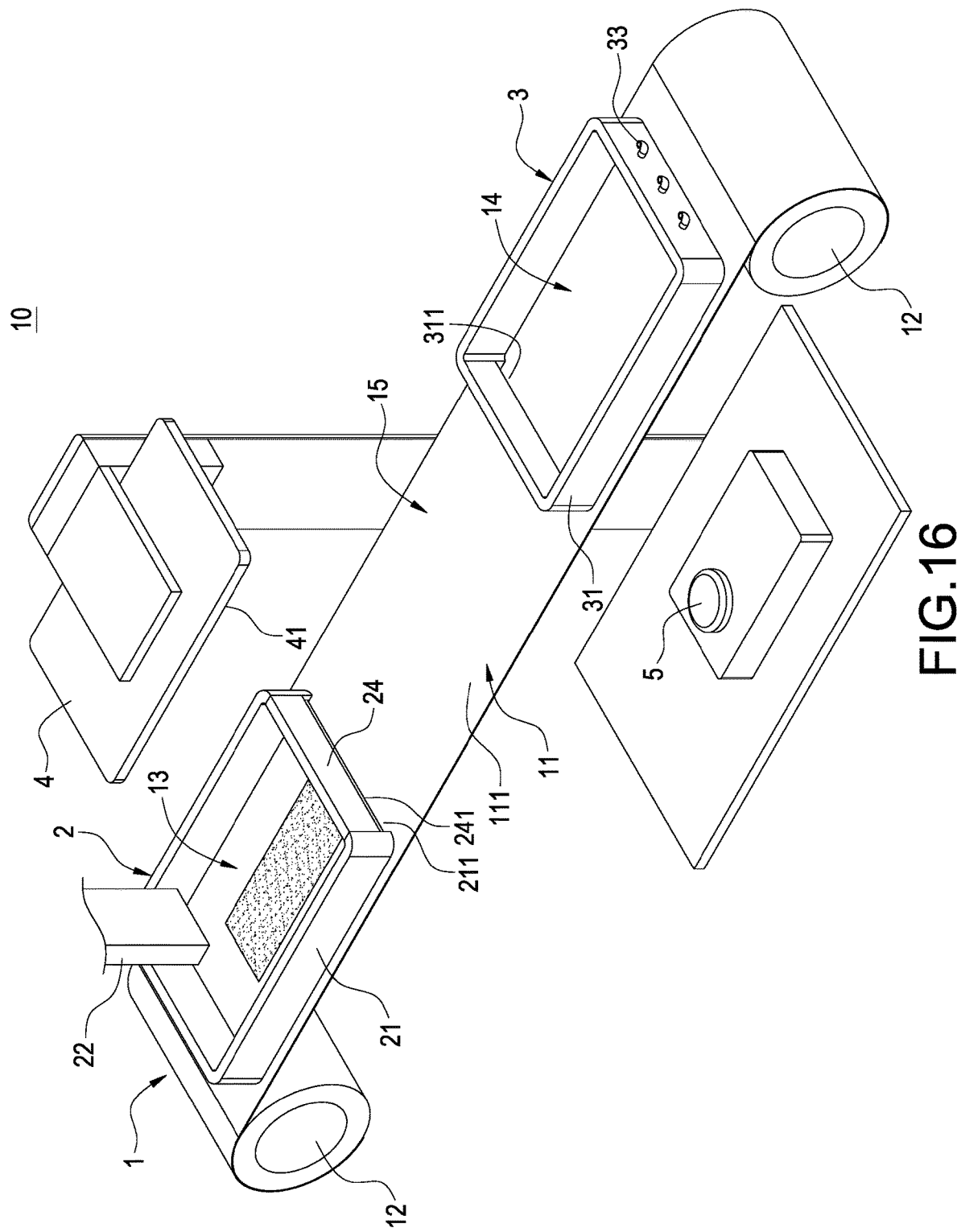
FIG. 16 is a schematic view showing a using status of a stereolithography 3D printer in accordance with another embodiment of this disclosure.

With reference to FIG. 16 for another embodiment of the stereolithography 3D printer 10, this embodiment is substantially the same as the embodiment as shown in FIGS. 1 to 15 except that the installation position of the discharge nozzle 22 is different in this embodiment.

Specifically, the discharge nozzle 22 is installed on an inner side of the first material box 21 away from the discharge port 211 as shown in FIG. 1, so that the printing material 100 ejected from the discharge nozzle 22 is distributed and filled as much as possible in the first material box 21. In FIG. 16, the discharge nozzle 22 is installed at the middle of the top of the first material box 21, so that the printing material 100 ejected from the discharge nozzle 22 is just disposed in an appropriate area of the first material box 21, but not necessarily distributed and filled up in the first material box 21.

Regardless of the discharge nozzle 22 being configured to be corresponsive to the middle of the first material box 21 or the inner side away from the discharge port 211, the printing material 100 is not necessarily filled up the first material box 21. The subsequent layer printing step can be carried out, as long as the printing material 100 disposed away from the discharge port 100 has reached a predetermined area.

In summation of the description above, this disclosure achieves the expected objectives and overcomes the drawbacks of the prior art, and this disclosure complies with patent application requirements, and is thus duly filed for patent application.

While this disclosure has been described by means of specific embodiments, numerous modifications and variations could be made thereto by those skilled in the art without departing from the scope and spirit of this disclosure set forth in the claims.

What is claimed is:

1. A stereolithography 3D printer used for a printing material (100), the stereolithography 3D printer (10) comprising:
   a transporting mechanism (1), including a translucent conveyor belt (11) divided into a discharge area (13) and a receiving area (14) and a curing area (15) defined between the discharge area (13) and the receiving area (14);
   a discharging mechanism (2), installed in the discharge area (13), and including a first material box (21) and a discharge nozzle (22), and the first material box (21) being disposed adjacent or attached to the translucent conveyor belt (11), and the discharge nozzle (22) being located in the first material box (21), and the first material box (21) having a discharge port (211) formed on a side thereof;
   a recycling mechanism (3), installed in the receiving area (14), and including a second material box (31) and a receiving sucker tip (32), and the second material box (31) being disposed adjacent or attached to the translucent conveyor belt (11), and the receiving sucker tip (32) located in the second material box (31), and the second material box (31) having a receiving port (311) formed on a side thereof, and the discharge port (211) and the receiving port (311) being configured to be corresponsive to each other, and the translucent conveyor belt (11) moving in a direction from the discharge port (211) towards the receiving port (311);
   a moving platform (4), installed in the curing area (15), and having a bearing surface (41) disposed opposite to the translucent conveyor belt (11); and
   a light source (5), configured to be corresponsive to the curing area (15),
   wherein the discharge nozzle (22) fills the printing material (100) into the first material box (21), and the translucent conveyor belt (11) continues moving in the direction from the discharge port (211) towards the receiving port (311), so that the printing material (100) gradually forms an appropriate area in the first material box (21), when printing material (100) stays on the curing area (15) and the moving platform (4) moves towards the translucent conveyor belt (11) to have the bearing surface (41) touch the printing material (100), a curing layer (200) of the printing material (100) is formed by projection of the light source (5) to the printing material (100), and the curing layer (200) chooses the bearing surface (41) with a surface friction coefficient greater than that of the translucent conveyor belt (11) to be attached thereon, and a remaining of the printing material (110) stays on the translucent conveyor belt (11), the translucent conveyor belt (11) continues moving in a direction from the discharge port (211) towards the receiving port (311), and the remaining of the printing material (100) enters the second material box (31) through the receiving port (311), and the remaining of printing material (100) is sucked and recycled by the receiving sucker tip (32).

2. The stereolithography 3D printer of claim 1, wherein the discharge port (211) has a first opening width (a) smaller than a second opening width (b) of the receiving port (311).

3. The stereolithography 3D printer of claim 1, wherein the discharging mechanism (2) further includes an adjustable gate (24) installed in the discharge port (211) and capable of moving towards or away from the translucent conveyor belt (11).

4. The stereolithography 3D printer of claim 3, wherein the adjustable gate (24) has a scraper (241).

5. The stereolithography 3D printer of claim 1, wherein the translucent conveyor belt (11) is a translucent film (111), and the transporting mechanism (1) further includes two reels (12), and each end of the translucent film (111) is wound on one of the two reels (12).

6. The stereolithography 3D printer of claim 1, wherein the discharging mechanism (2) further includes a plurality of material tubes (23) installed on the discharge nozzle (22).

7. The stereolithography 3D printer of claim 1, wherein the recycling mechanism (3) further includes a plurality of suction tubes (33) installed on the receiving sucker tip (32).

8. The stereolithography 3D printer of claim 1, wherein the light source (5) and the moving platform (14) are installed on two opposite sides of the translucent conveyor belt (11).

\* \* \* \* \*